US012783895B2

(12) United States Patent
Dong et al.

(10) Patent No.: US 12,783,895 B2
(45) Date of Patent: Nov. 3, 2026

(54) LARGE LANGUAGE MODEL WITH ELASTIC RESOURCES

(71) Applicant: International Business Machines Corporation, Armonk, NY (US)

(72) Inventors: Lin Dong, Beijing (CN); Qing Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 18/594,199

(22) Filed: Mar. 4, 2024

(65) Prior Publication Data

US 2025/0278632 A1 Sep. 4, 2025

(51) Int. Cl.
*G06F 17/00* (2019.01)
*G06F 40/40* (2020.01)
*G06N 3/0895* (2023.01)

(52) U.S. Cl.
CPC ........... *G06N 3/0895* (2023.01); *G06F 40/40* (2020.01)

(58) Field of Classification Search
CPC .............................. G06F 40/40; G06N 3/0895
USPC .............................................................. 704/9
See application file for complete search history.

(56) References Cited

U.S. PATENT DOCUMENTS

| | | | | |
|---|---|---|---|---|
| 2019/0303211 | A1* | 10/2019 | Dias | H04L 47/2425 |
| 2021/0158147 | A1 | 5/2021 | Vinod et al. | |

FOREIGN PATENT DOCUMENTS

| | | | |
|---|---|---|---|
| CN | 112862662 | A | 5/2021 |
| CN | 112860871 | B | 6/2022 |
| CN | 114676761 | A | 6/2022 |

OTHER PUBLICATIONS

Betts: Estimating the WCET of GPU-Accelerated Applications Using Hybrid Analysis (Year: 2013).*
Narayanan: PipeDream: Generalized Pipeline Parallelism for DNN Training (Year: 2019).*
Qiao: Pollux: Co-adaptive Cluster Scheduling for Goodput-Optimized Deep Learning (Year: 2021).*
(Continued)

*Primary Examiner* — Paul C Mccord
(74) *Attorney, Agent, or Firm* — Cantor Colburn LLP; Rakesh Roy

(57) ABSTRACT

Aspects of the invention include techniques for providing a large language model with elastic resources. A non-limiting example method includes training a large language model within a parallelized training environment that includes a set of training resources. The large language model is split into a plurality of pieces and each training resource trains over one piece. Baseline metrics are collected for the parallelized training environment. The method includes determining whether a current number of available training resources is an integer multiple of a minimum threshold of training resources and initializing one or more try-runs to evaluate vertical scaling and/or horizontal scaling responsive to the determination. A try-run having a highest improvement metric is identified and, responsive to the highest improvement metric being greater than a predetermined threshold, a training pattern is updated using one or both of a vertical scaling and a horizontal scaling of the set of training resources.

11 Claims, 6 Drawing Sheets

(56) References Cited

OTHER PUBLICATIONS

Rajbhandari et al. "Zero: Memory optimizations toward training trillion parameter models." SC20: International Conference for High Performance Computing, Networking, Storage and Analysis. IEEE, (2020): 24 pages.

Zhao et al. "PyTorch FSDP: experiences on scaling fully sharded data parallel." arXiv preprint arXiv:2304.11277 (2023): 13 pages.

* cited by examiner

LARGE LANGUAGE MODEL WITH ELASTIC RESOURCES

BACKGROUND

The present invention generally relates to machine learning, and more specifically, to computer systems, computer-implemented methods, and computer program products for providing a large language model with elastic resources.

Large language models (LLMs) refer generally to a class of natural language processing (NLP) models characterized by a vast parameter size and the ability to understand and generate human-like text. Large language models are capable of processing large amounts of incoming text data and generating high-quality natural language responses. In practice, large language models have been used for a wide range of natural language processing (NLP) tasks, including, for example, machine translation, text generation, sentiment analysis, and question answering (i.e., query-and-response). Large language models have also been adapted for other domains, such as computer vision, speech recognition, and software development.

At its core, a large language model consists of an encoder and a decoder. The encoder takes in a sequence of input tokens, such as words or characters, and produces a sequence of hidden representations for each token that capture the contextual information of the input sequence. The decoder then uses these hidden representations, along with a sequence of target tokens, to generate a sequence of output tokens (e.g., next word prediction).

The most popular and widely used types of large language models are recurrent neural networks (RNNs) and transformers. RNNs are neural networks that process sequences of inputs one by one and use a hidden state to remember previous inputs. RNNs are particularly well-suited for tasks that involve sequential data, such as text, audio, and time-series data. In a transformer, on the other hand, the encoder and decoder are composed of multiple layers of multi-headed self-attention and feedforward neural networks. The core of the transformer model is the self-attention mechanism, which allows the model to focus on different parts of an input sequence at different timesteps, without the need for recurrent connections that process the sequence one by one. Transformers leverage self-attention to compute representations of input sequences in a parallel and context-aware manner and are well-suited to tasks that require capturing long-range dependencies between words in a sentence, such as in language modeling and machine translation.

SUMMARY

Embodiments of the present invention are directed to techniques for providing a large language model with elastic resources. A non-limiting example method includes training a large language model within a parallelized training environment that includes a set of training resources. The large language model is split into a plurality of pieces and each training resource trains over one piece. Baseline metrics are collected for the parallelized training environment. The method includes determining whether a current number of available training resources is an integer multiple of a minimum threshold of training resources and initializing one or more try-runs to evaluate vertical scaling and/or horizontal scaling responsive to the determination. A try-run having a highest improvement metric is identified and, responsive to the highest improvement metric being greater than a predetermined threshold, a training pattern is updated using one or both of a vertical scaling and a horizontal scaling of the set of training resources.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
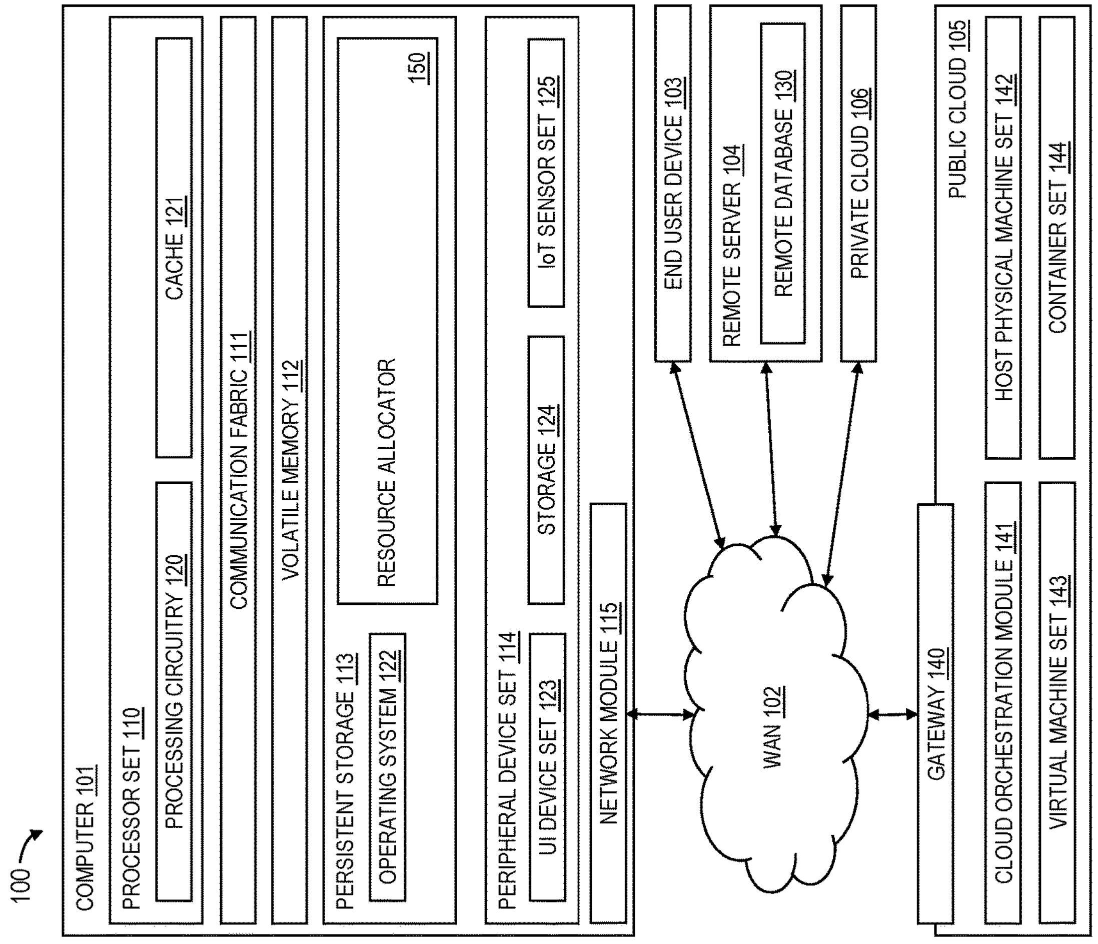
FIG. 1 depicts a block diagram of an example computing environment for use in conjunction with one or more embodiments.

The diagrams depicted herein are illustrative. There can be many variations to the diagram or the operations described therein without departing from the spirit of the invention. For instance, the actions can be performed in a differing order or actions can be added, deleted or modified.

In the accompanying figures and following detailed description of the described embodiments of the invention, the various elements illustrated in the figures are provided with two or three-digit reference numbers. With minor exceptions, the leftmost digit(s) of each reference number correspond to the figure in which its element is first illustrated.

DETAILED DESCRIPTION

According to an aspect of the disclosure, there is provided a method for providing a large language model with elastic resources. A non-limiting example method includes training a large language model within a parallelized training environment having a set of training resources. The large language model can be split into a plurality of pieces, each training resource of the set of training resources training over one piece of the plurality of pieces. The method includes collecting baseline metrics for the parallelized training environment. The baseline metrics include at least a time cost of a current training run per a number of cycles for the current training run. The method includes determining whether a current number of available training resources is an integer multiple of a minimum threshold of training resources. Responsive to the current number of available training resources being an integer multiple of the minimum threshold of training resources: one or more try-runs are initialized to evaluate vertical scaling to evaluate horizontal scaling. Responsive to the current number of available training resources not being an integer multiple of the minimum threshold of training resources, one or more try-runs are initialized that only evaluate vertical scaling. The method includes identifying a try-run having a highest improvement metric and, responsive to the highest improvement metric being greater than a predetermined threshold, updating a training pattern for the parallelized training environment. The updated training pattern includes one or both of a vertical scaling and a horizontal scaling of the set of training resources. Advantageously, maintaining the parallelized training environment in this manner enables vertical and horizontal scaling as soon as the required resources become available.

In some embodiments, the training of the large language model initializes in response to the current number of training resources being at least equal to the minimum threshold of training resources. Advantageously, the minimum threshold avoids a waste of compute until a desired number of GPUs are available.

In some embodiments, the method includes determining a maximum threshold of training resources for training the large language model. Advantageously, the maximum threshold can prevent over-allocating training resources to the parallelized training environment.

In some embodiments, the baseline metrics include a first training efficiency metric when using a first number of training resources. In some embodiments, the method includes determining a second training efficiency metric for at least one try-run. The second training efficiency metric is defined as a ratio between a number of samples used during the respective try-run and a total time of the try-run when using a second number of training resources. Advantageously, the first training efficiency metric and the second training efficiency metric enable a straightforward apples-to-apples comparison of the training efficiencies offered using each respective training regime.

In some embodiments, the highest improvement metric is defined as a ratio of the second training efficiency metric to the first training efficiency metric divided by a ratio of the second number of training resources to the first number of training resources. Advantageously, the highest improvement metric can be compared directly against a predetermined threshold for improvement metrics to determine when, or if, to initiate vertical and/or horizontal scaling.

In some embodiments, the method includes saving a current training state of the parallelized training environment prior to initializing a try-run for evaluating training efficiency metrics. Advantageously, the parallelized training environment can be rapidly returned to the original training state if no vertical or horizontal scaling is required.

According to an aspect of the disclosure, there is provided a system having a memory, computer readable instructions, and one or more processors for executing the computer readable instructions, the computer readable instructions controlling the one or more processors to perform operations. The operations include training a large language model within a parallelized training environment having a set of training resources. The large language model can be split into a plurality of pieces, each training resource of the set of training resources training over one piece of the plurality of pieces. The method includes collecting baseline metrics for the parallelized training environment. The baseline metrics include at least a time cost of a current training run per a number of cycles for the current training run. The method includes determining whether a current number of available training resources is an integer multiple of a minimum threshold of training resources. Responsive to the current number of available training resources being an integer multiple of the minimum threshold of training resources: one or more try-runs are initialized to evaluate vertical scaling to evaluate horizontal scaling. Responsive to the current number of available training resources not being an integer multiple of the minimum threshold of training resources, one or more try-runs are initialized that only evaluate vertical scaling. The method includes identifying a try-run having a highest improvement metric and, responsive to the highest improvement metric being greater than a predetermined threshold, updating a training pattern for the parallelized training environment. The updated training pattern includes one or both of a vertical scaling and a horizontal scaling of the set of training resources. Advantageously, maintaining the parallelized training environment in this manner enables vertical and horizontal scaling as soon as the required resources become available.

In some embodiments, the training of the large language model initializes in response to the current number of training resources being at least equal to the minimum threshold of training resources. Advantageously, the minimum threshold avoids a waste of compute until a desired number of GPUs are available.

In some embodiments, the operations further include determining a maximum threshold of training resources for training the large language model. Advantageously, the maximum threshold can prevent over-allocating training resources to the parallelized training environment.

In some embodiments, the baseline metrics include a first training efficiency metric when using a first number of training resources. In some embodiments, the method includes determining a second training efficiency metric for at least one try-run. The second training efficiency metric is defined as a ratio between a number of samples used during the respective try-run and a total time of the try-run when using a second number of training resources. Advantageously, the first training efficiency metric and the second training efficiency metric enable a straightforward apples-to-apples comparison of the training efficiencies offered using each respective training regime.

In some embodiments, the highest improvement metric is defined as a ratio of the second training efficiency metric to the first training efficiency metric divided by a ratio of the second number of training resources to the first number of training resources. Advantageously, the highest improvement metric can be compared directly against a predetermined threshold for improvement metrics to determine when, or if, to initiate vertical and/or horizontal scaling.

In some embodiments, the operations further include saving a current training state of the parallelized training environment prior to initializing a try-run for evaluating training efficiency metrics. Advantageously, the parallelized training environment can be rapidly returned to the original training state if no vertical or horizontal scaling is required.

According to an aspect of the disclosure, there is provided a computer program product including a computer readable storage medium having program instructions embodied therewith, the program instructions executable by one or more processors to cause the one or more processors to perform operations. The operations include training a large language model within a parallelized training environment having a set of training resources. The large language model can be split into a plurality of pieces, each training resource of the set of training resources training over one piece of the plurality of pieces. The method includes collecting baseline metrics for the parallelized training environment. The baseline metrics include at least a time cost of a current training run per a number of cycles for the current training run. The method includes determining whether a current number of available training resources is an integer multiple of a minimum threshold of training resources. Responsive to the current number of available training resources being an integer multiple of the minimum threshold of training resources: one or more try-runs are initialized to evaluate vertical scaling to evaluate horizontal scaling. Responsive to the current number of available training resources not being an integer multiple of the minimum threshold of training resources, one or more try-runs are initialized that only evaluate vertical scaling. The method includes identifying a try-run having a highest improvement metric and, responsive to the highest improvement metric being greater than a predetermined threshold, updating a training pattern for the parallelized training environment. The updated training pattern includes one or both of a vertical scaling and a horizontal scaling of the set of training resources. Advantageously, maintaining the parallelized training environment in this manner enables vertical and horizontal scaling as soon as the required resources become available.

In some embodiments, the training of the large language model initializes in response to the current number of training resources being at least equal to the minimum threshold of training resources. Advantageously, the minimum threshold avoids a waste of compute until a desired number of GPUs are available.

In some embodiments, the operations further include determining a maximum threshold of training resources for training the large language model. Advantageously, the maximum threshold can prevent over-allocating training resources to the parallelized training environment.

In some embodiments, the baseline metrics include a first training efficiency metric when using a first number of training resources. In some embodiments, the method includes determining a second training efficiency metric for at least one try-run. The second training efficiency metric is defined as a ratio between a number of samples used during the respective try-run and a total time of the try-run when using a second number of training resources. Advantageously, the first training efficiency metric and the second training efficiency metric enable a straightforward apples-to-apples comparison of the training efficiencies offered using each respective training regime.

In some embodiments, the highest improvement metric is defined as a ratio of the second training efficiency metric to the first training efficiency metric divided by a ratio of the second number of training resources to the first number of training resources. Advantageously, the highest improvement metric can be compared directly against a predetermined threshold for improvement metrics to determine when, or if, to initiate vertical and/or horizontal scaling.

In some embodiments, the operations further include saving a current training state of the parallelized training environment prior to initializing a try-run for evaluating training efficiency metrics. Advantageously, the parallelized training environment can be rapidly returned to the original training state if no vertical or horizontal scaling is required.

Large language models are typically trained on large amounts of text data, often containing hundreds of millions if not billions of words. Large language models can be trained using backpropagation and gradient descent, with the objective of minimizing a loss function such as cross-entropy loss. The training process can take several days or even weeks, depending on the size of the model and the amount of training data involved.

To handle the sizable amount of data required for training, the training process itself is often highly parallelized. Training a training large language model can often involve splitting the model into several pieces and distributing those pieces across two or more computing resources, often graphics processing units (GPUs), as a full-sized large language model cannot usually fit onto a single device.

Challenges remain in determining how to most effectively and efficiently scale the computing resources that are available for training a large language model. Most of the time, each computing device (e.g., GPU) will hold as much of the model as possible (that is, the largest possible model piece) to improve resource usage. Problems arise, however, when there are changes in the number of GPU devices available for training, such as in the case of an elastic distributed training regime where the available GPU devices change aperiodically across time. Notably, using a fixed number of GPU devices in this scenario, while stable and predictable, will reduce overall resource utilization and fail to capture opportunities to accelerate training. This is particularly noticeable during periods of resource overallocation, that is, periods where the number of available GPUs is greater than strictly required for training. Unfortunately, current architectures do not provide a solution regarding the proper allocation policy and training pattern when there are more than enough GPU devices for training.

This disclosure introduces new methods, computing systems, and computer program products for providing a large language model with elastic resources. Rather than relying on a fixed resource allocation scheme, described herein is a dynamic, elastic resource allocation scheme and system that leverages a scoring model to dynamically scale the number of computing resources horizontally or vertically, as needed, during model training. The scoring model enables an end-to-end training flow and architecture for leveraging an arbitrarily changing number of GPU devices when training a large language model. Instead of using a fixed scaling policy, such as always scaling up model training with available GPU devices, the scaling model described herein is configured to determine whether the system should scale up training vertically or horizontally, or to keep resource allocation as is, when more GPU devices become available. In some embodiments, when a new GPU device(s) become available, the system provisionally includes the new device(s) within the current training cycle and then computes one or more training efficiency metrics, such as samples/seconds, for determining whether and how to best include the new device(s) within the training scheme. When there are enough resources to support either vertical or horizontal scaling, the system can consider both scenarios provisionally, compute the desired training efficiency metrics in each case, and select whichever training scheme offered the highest performance. As used herein, "vertical scaling" refers to a scenario in which the pieces of a model are further split for distribution among the current and newly available computing resources. For example, a model currently split into 4 pieces across 4 GPUs can be split into 6 pieces to accommodate two new computing resources. As used herein, "horizontal scaling" refers to a scenario in which model pieces are not further split but are instead copied (replicated) for parallel training among two or more training resources. For example, a model currently split into 4 pieces across 4 GPUs can be copied to provide 8 pieces to allow parallel training with 2 GPUs assigned to respective copies of each original piece.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as resource allocator 150 (also referred to herein as block 150). In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It is to be understood that the block diagram of FIG. 1 is not intended to indicate that the computing environment 100 is to include all of the components shown in FIG. 1. Rather, the computing environment 100 can include any appropriate fewer or additional components not illustrated in FIG. 1 (e.g., additional memory components, embedded controllers, modules, additional network interfaces, etc.). Further, the embodiments described herein with respect to the computing environment 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
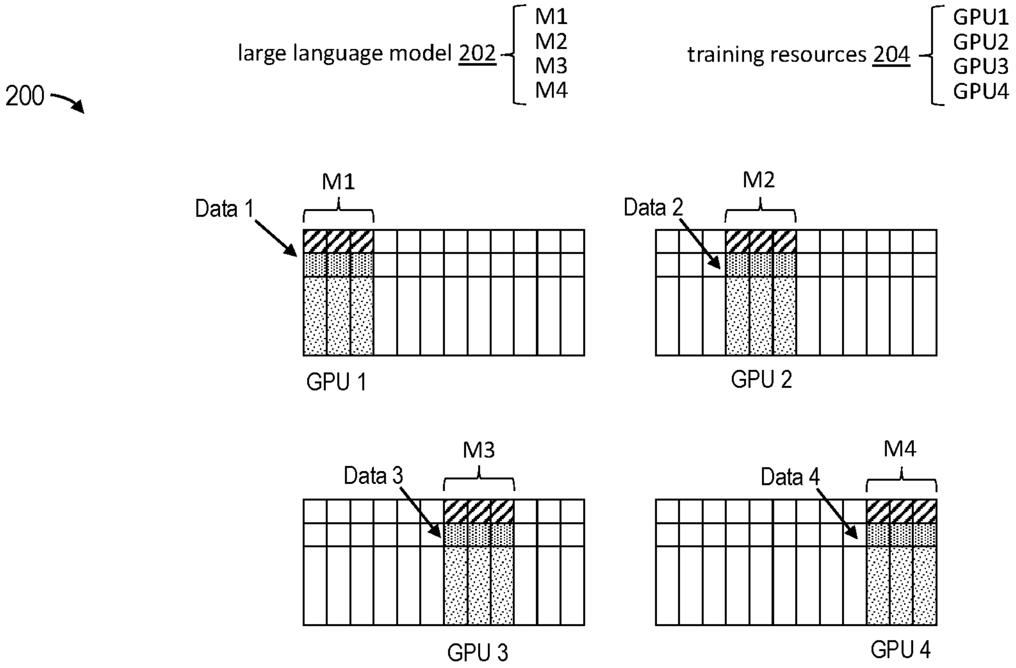
FIG. 2 depicts a block diagram of a parallelized training environment as assigned by a training resource allocator in accordance with one or more embodiments.

FIG. 2 depicts a block diagram of a parallelized training environment 200 as assigned by a training resource allocator (e.g., the resource allocator 150 of FIG. 1) according to one or more embodiments described herein. As shown in FIG. 2, the parallelized training environment 200 includes a large language model 202 that has been split into four pieces M1, M2, M3, and M4. Each piece of the large language model 202 can represent the same, or a different, portion of the large language model 202.

As further shown in FIG. 2, the parallelized training environment 200 includes a number of training resources 204. The training resources 204 can include processors, application specific integrated circuits (ASICs), programmable gate arrays (PGAs), field programmable gate arrays (FPGAs), GPUs, etc. In some embodiments, the training resources 204 are GPUs (e.g., GPU 1, GPU 2, GPU 3, and GPU 4). In some embodiments, the pieces M1, M2, M3, and M4 of the large language model 202 have been separately allocated among GPU 1, GPU 2, GPU 3, and GPU 4, respectively.

In some embodiments, the pieces M1, M2, M3, and M4 of the large language model 202 are further segmented into data segments (e.g., "data 1", "data 2", "data 3", "data 4"). In some embodiments, the data segments within each respective GPU define a single, different piece of the large language model 202. For example, the three data segments "Data 1" assigned to GPU 1 define the piece M1 of the large language model 202. The number of data segments within each respective GPU can be the same, or different. For example, each of the training resources 204 can be assigned three data segments (as shown).

Figure 3:
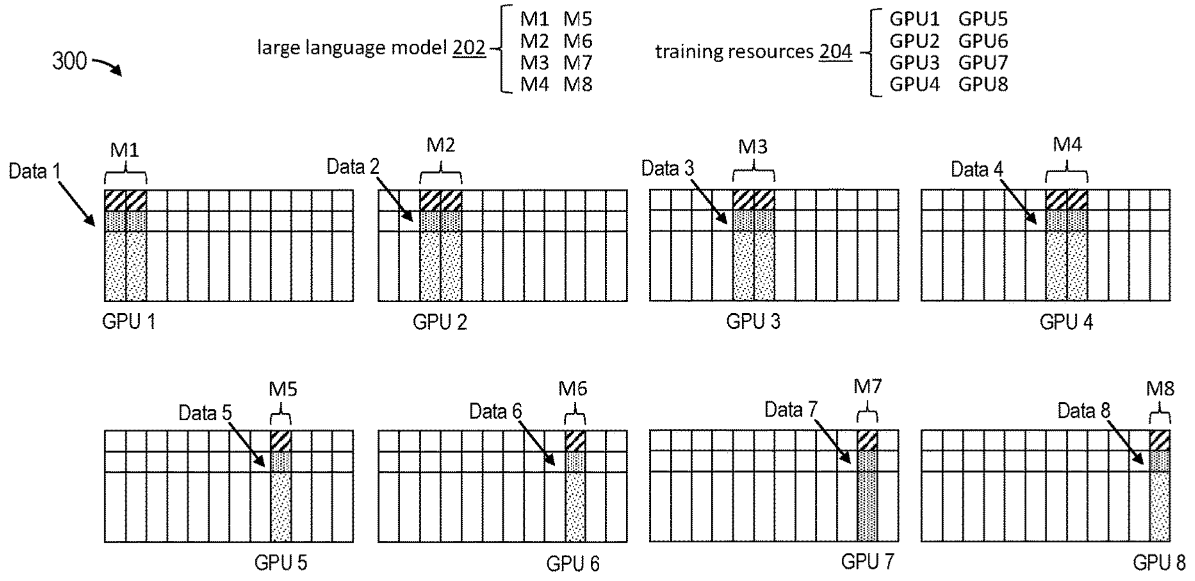
FIG. 3 depicts a block diagram of a parallelized training environment as assigned by a training resource allocator in accordance with one or more embodiments.

FIG. 3 depicts a block diagram of a parallelized training environment 300 as assigned by a training resource allocator (e.g., the resource allocator 150 of FIG. 1) according to one or more embodiments described herein. As shown in FIG. 3, the parallelized training environment 300 includes a large language model 202 that has been split into eight pieces M1, M2, M3, M4, M5, M6, M7, and M8. The parallelized training environment 300 can represent a progression from the parallelized training environment 200 of FIG. 2 after the additional allocation of training resources 204, after which the original four pieces of the large language model 202 have been split into eight pieces M1, M2, M3, M4, M5, M6, M7, and M8. Notably, the training resources 204 now include GPU 5, GPU 6, GPU 7, and GPU 8, in addition to the GPUs previously allocated (GPU 1, GPU 2, GPU 3, and GPU 4, refer to FIG. 2).

As further shown in FIG. 3, the pieces M1, M2, M3, M4, M5, M6, M7, and M8 of the large language model 202 have been separately allocated among GPU 1, GPU 2, GPU 3, GPU 4, GPU 5, GPU 6, GPU 7, and GPU 8, respectively. In some embodiments, the pieces M1, M2, M3, M4, M5, M6, M7, and M8 of the large language model 202 are further segmented into data segments (e.g., "data 1", "data 2", "data 3", "data 4", "data 5", "data 6", "data 7", "data 8").

In contrast to the parallelized training environment 200 shown in FIG. 2, the data segments within each respective GPU define different proportions of the large language model 202. For example, two data segments "Data 1" are assigned to GPU 1 (similarly GPU 2, GPU 3, GPU 4) while only a single data segment "Data 5" is assigned to GPU 5 (similar GPU 6, GPU 7, GPU 8). This can occur, for example, as a result of a dynamic vertical scaling (vertical reallocation) of the data segments in response to GPU 5, GPU 6, GPU 7, and GPU 8 becoming available. Observe that one data segment has been removed from each of GPU 1, GPU 2, GPU 3, and GPU 4 and reassigned to GPU 5, GPU 6, GPU 7, and GPU 8. In some embodiments, a resource allocator (e.g., the resource allocator 150 of FIG. 1) determines whether and how to initiate this vertical scaling. The resource allocator and vertical scaling are described in greater detail with respect to FIG. 5.

Figure 4:
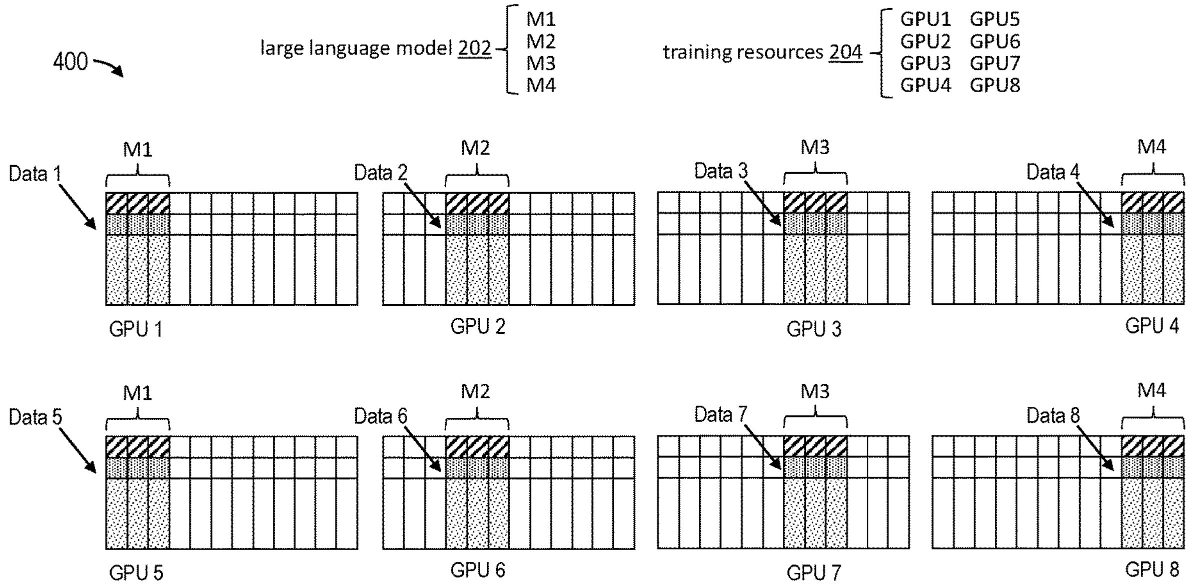
FIG. 4 depicts a block diagram of a parallelized training environment as assigned by a training resource allocator in accordance with one or more embodiments.

FIG. 4 depicts a block diagram of a parallelized training environment 400 as assigned by a training resource allocator (e.g., the resource allocator 150 of FIG. 1) according to one or more embodiments described herein. As shown in FIG. 4, the parallelized training environment 400 includes a large language model 202 that has been split into four pieces M1, M2, M3, and M4. The parallelized training environment 400 can represent a progression from the parallelized training environment 200 of FIG. 2 after the additional allocation of training resources 204. In particular, the training resources 204 now include GPU 5, GPU 6, GPU 7, and GPU 8, in addition to the GPUs previously allocated (GPU 1, GPU 2, GPU 3, and GPU 4, refer to FIG. 2).

As further shown in FIG. 4, two copies of the pieces M1, M2, M3, and M4 of the large language model 202 have been allocated among GPU 1, GPU 2, GPU 3, GPU 4, GPU 5, GPU 6, GPU 7, and GPU 8. In some embodiments, the pieces M1, M2, M3, and M4 of the large language model 202 are further segmented into data segments (e.g., "data 1", "data 2", "data 3", "data 4", "data 5", "data 6", "data 7", "data 8").

In contrast to the parallelized training environment 200 shown in FIG. 2, the data segments within the pieces M1, M2, M3, and M4 (that is, "Data 1", "Data 2", "Data 3", and "Data 4") have been copied to provide, respectively, "Data 5", "Data 6", "Data 7", and "Data 8". In other words, each piece of the large language model 202 is assigned to a pair of GPUs for parallel training. For example, the three data segments "Data 1" for M1 are assigned to GPU 1 and a copy of the three data segments "Data 1", labeled "Data 5", are assigned to GPU 5. This can occur, for example, as a result of a dynamic horizontal scaling (horizontal reallocation) of the data segments in response to GPU 5, GPU 6, GPU 7, and GPU 8 becoming available. In some embodiments, a resource allocator (e.g., the resource allocator 150 of FIG. 1) determines whether and how to initiate this horizontal scaling. The resource allocator and horizontal scaling are described in greater detail with respect to FIG. 5.

Figure 5:
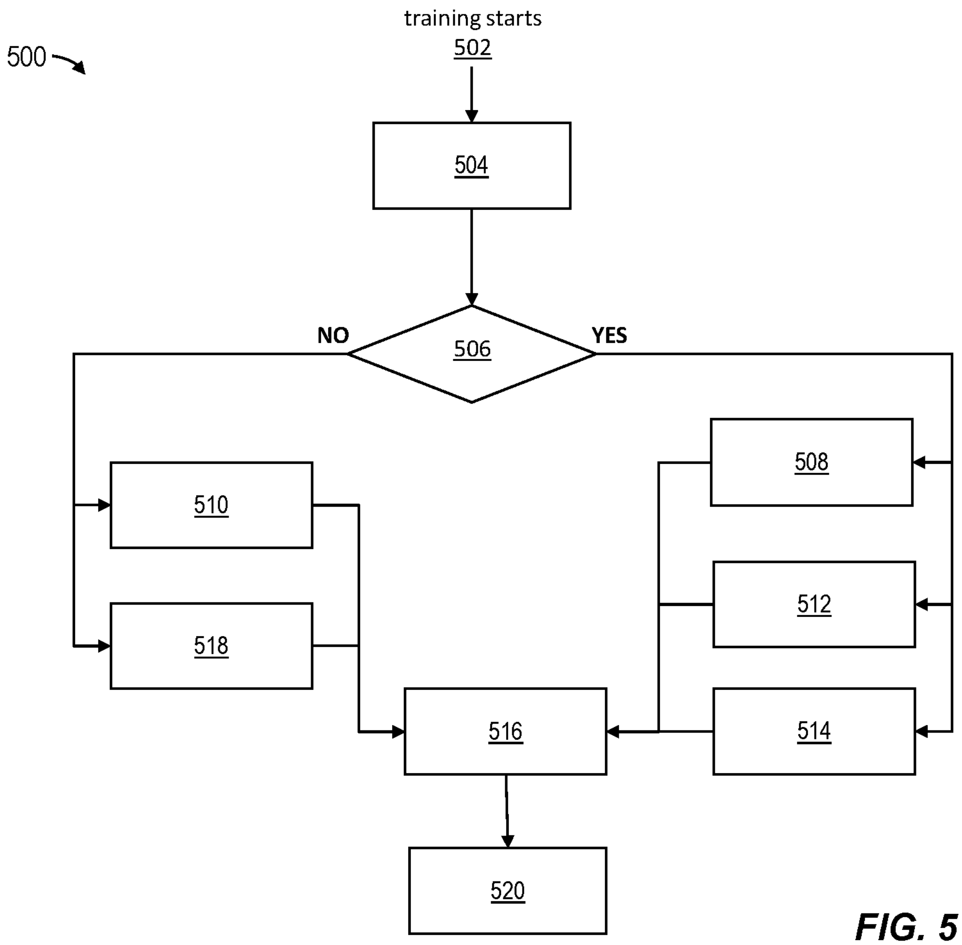
FIG. 5 depicts a process for maintaining a parallelized training environment in accordance with one or more embodiments.

FIG. 5 depicts a process 500 for maintaining a parallelized training environment (e.g., the parallelized training environments 200, 300, 400 of FIGS. 2, 3, 4) according to one or more embodiments described herein. In some embodiments, each step of process 500 is a module, or is completed using a module, of a training resource allocator 150.

As shown in FIG. 5, the process 500 begins at step 502, when training starts for a large language model 202. In some embodiments, training starts once a minimum threshold of training resources 204 are available. In some embodiments, the training resource allocator 150 determines a current number of available training resources 204. In some embodiments, the training resource allocator 150 compares the current number of available training resources 204 to the minimum threshold of training resources 204. For example, step 502 can be initialized once the training resource allocator 150 determines that at least four GPUs are available for training the large language model 202, although other minimum thresholds are within the contemplated scope of this disclosure.

In some embodiments, the training resource allocator 150 determines, at step 504, a maximum threshold of training resources 204 for training the large language model 202. For example, at step 504 the training resource allocator 150 can limit the maximum threshold of GPUs to 20, although other maximum thresholds are within the contemplated scope of this disclosure. In some embodiments, the training resource allocator 150 determines, at step 502 and/or step 504, that a current number of available training resources 204 is between the minimum threshold and the maximum threshold. In other words, the training resource allocator 150 can determine that one or more additional training resources 204 (e.g., additional GPUs) are available for training.

At step 506, the training resource allocator 150 determines whether the current number of available training resources 204 is an integer multiple of the minimum threshold of available training resources 204. For example, if the minimum threshold of available training resources 204 is four, the training resource allocator 150 determines whether the current number of available training resources 204 is equal to 4 N, where N is an integer (equivalently, that the current number mod the minimum number is zero). If the current number of available training resources 204 is an integer multiple of the minimum number ("YES"), the process 500 proceeds to step 508 to determine whether vertical scaling and/or horizontal scaling is appropriate. If the current number of available training resources 204 is not an integer multiple of the minimum number ("NO"), the process 500 proceeds to step 510 to determine whether vertical scaling is appropriate (horizontal scaling is not evaluated in this scenario).

At step 508, the training resource allocator 150 collects baseline metrics for the parallelized training environment (that is, for the ongoing training for the large language model 202 which began at step 502). In some embodiments, the baseline metrics (also referred to as training efficiency metrics) are collected before initiating any so-called try runs for vertical and/or horizontal scaling. The baseline metrics are not meant to be particularly limited, but can include, for example, the time cost of the current run per the number of cycles for the current run.

After collecting baseline metrics at step 508, the process 500 proceeds to step 512 and/or step 514. At step 512, the training resource allocator 150 initiates a try-run to evaluate vertical scaling (refer to FIG. 3). In some embodiments, the training resource allocator 150 determines one or more vertical scaling training efficiency metrics during the try-run. At step 514, the training resource allocator 150 initiates a try-run to evaluate horizontal scaling (refer to FIG. 4). In some embodiments, the training resource allocator 150 determines one or more horizontal scaling training efficiency metrics during the try-run. Steps 512 and 514 can occur sequentially in any order, or substantially concurrently, as desired.

In some embodiments, the current training state can be saved prior to initializing a try-run for evaluating training efficiency metrics. While the training efficiency metrics are not meant to be particularly limited, the following scenario provides an example analysis. Other training efficiency metrics are possible, and all such configurations are within the contemplated scope of this disclosure.

In some embodiments, a threshold improvement metric "R" is defined for determining whether vertical and/or horizontal scaling is appropriate. In some embodiments, R is the minimum ratio of increased training speed required to initialize the new training resources 204. In other words, if an increase in training efficiency is below R, the training resource allocator 150 does not initialize vertical and/or horizontal scaling, even if there is a positive (nominal) increase in training speed.

Let "$E_1$" define the current training efficiency metric (that is, the baseline training efficiency of the ongoing training which began at step 502) and let "$G_1$" define the number of training resources 204 (e.g., GPU devices) used when determining the current baseline. In some embodiments, a training efficiency metric "$E_2$" for a potential training pattern (vertical and/or horizontal training) is defined as $E_2=N/T$, where N is the number of samples used during the respective try-run and T is the total time of the try-run. Let "$G_2$" define the number of training resources 204 (e.g., GPU devices) used when determining the respective try-run.

At step 516, the training resource allocator 150 selects a scaling policy (do nothing vs. vertical scaling and/or horizontal scaling). In some embodiments, an improvement metric "I" is defined as $I=(E_2/E_1)/(G_2/G_1)$. In some embodiments, the training resource allocator 150 determines a maximum I ("$I_{max}$") among the available training patterns (do nothing, vertical scaling, horizontal scaling, a combination of vertical and horizontal scaling, etc.). In some embodiments, if $I_{max}$ is greater than the threshold improvement metric R, the training resource allocator 150 initiates the associated scaling solution. For example, if $I_{max}$ occurs for vertical scaling and is greater than R, the training resource allocator 150 integrates the additional training resources 204 using a vertical scaling solution (refer to FIG. 3). Similarly, if $I_{max}$ occurs for horizontal scaling and is greater than R, the training resource allocator 150 integrates the additional training resources 204 using a horizontal scaling solution (refer to FIG. 4). In some embodiments, if $I_{max}$ is less than R, or if $E_2$ is less than $E_1$, no change occurs. In that scenario, the previously saved current training state can be reinitialized and training can continue using the prior parallelized training environment. For scenarios having a global batch size control, process 500 can be completed within an elastic distributed training framework, meaning that a batch of try-runs are only run when the current global batch size is not reached.

Returning now to step 510, the training resource allocator 150 collects baseline metrics for the parallelized training environment in a similar manner as described with respect to step 508, except that the training resource allocator 150 will only be evaluating vertical scaling solutions. After collecting baseline metrics at step 510, the process 500 proceeds to step 518. At step 518, the training resource allocator 150 initiates a try-run to evaluate vertical scaling (refer to FIG. 3). In some embodiments, the training resource allocator 150 determines one or more vertical scaling training efficiency metrics during the try-run, in a similar manner as described previously with respect to step 512. Following step 518, process 500 proceeds to step 516. In this scenario, the training resource allocator 150 selects a scaling policy that does not consider horizontal scaling (do nothing vs. vertical scaling).

In some embodiments, the process 500 completes at step 520, where the training pattern is updated if needed (that is, vertical scaling and/or horizontal scaling are initialized according to the earlier training efficiency determinations). In some embodiments, the training resource allocator 150 returns to step 502 and/or step 504, and awaits a future change in the number of available training resources 204 (increases or decreases). Process 500 can then repeat, as many times as needed, to continuously and/or periodically re-evaluate the ongoing training for the large language model 202 responsive to changes in the number of available training resources 204.

Figure 6:
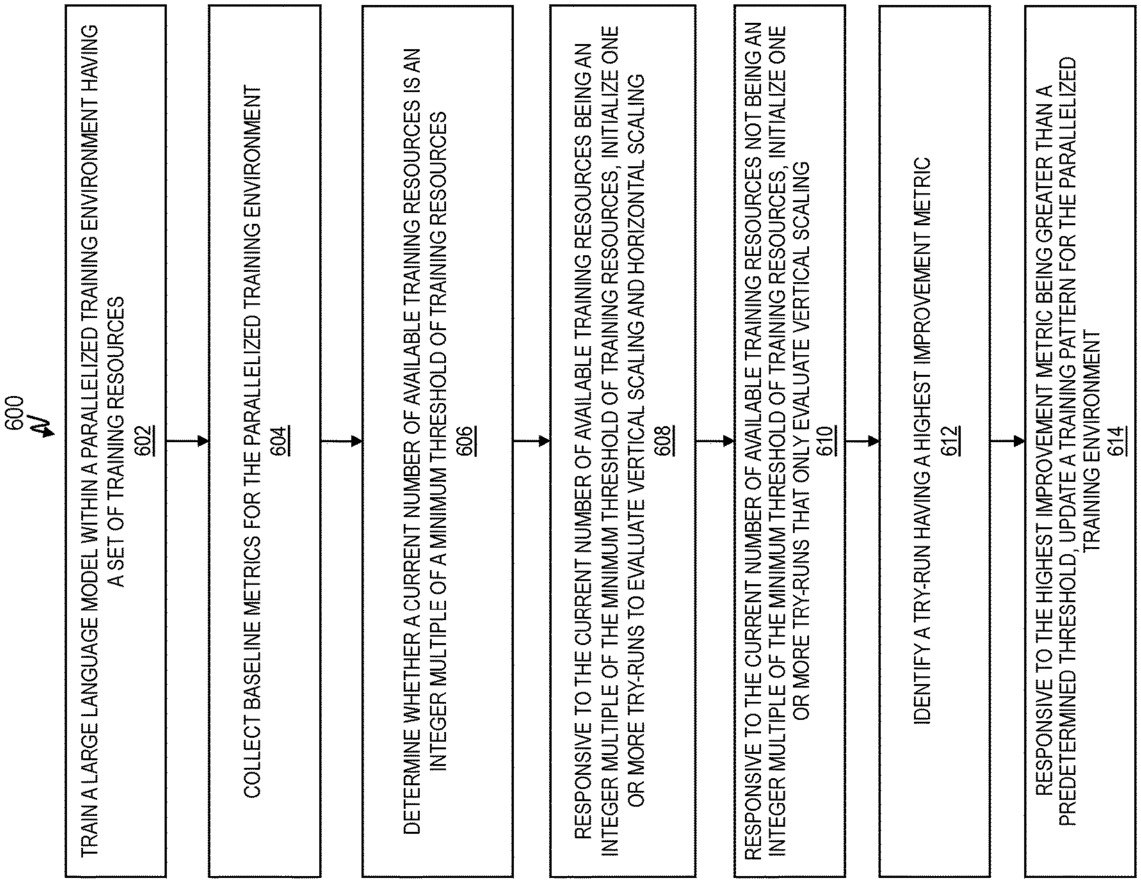
FIG. 6 depicts a flowchart in accordance with one or more embodiments of the present invention.

Referring now to FIG. 6, a flowchart 600 for collaborative prompt building for providing a large language model with elastic resources is generally shown according to an embodiment. The flowchart 600 is described in reference to FIGS. 1-5 and may include additional blocks not depicted in FIG. 6. Although depicted in a particular order, the blocks depicted in FIG. 6 can be rearranged, subdivided, and/or combined. In exemplary embodiments, the flowchart 600 can be performed by a computing environment (e.g., computing environment 100 shown in FIG. 1).

At block 602, the method includes training a large language model within a parallelized training environment that includes a set of training resources. In some embodiments, the large language model is split into a plurality of pieces. In some embodiments, each training resource of the set of training resources trains over one piece of the plurality of pieces. In some embodiments, the training of the large language model initializes in response to the current number of training resources being at least equal to the minimum threshold of training resources.

At block 604, the method includes collecting baseline metrics for the parallelized training environment. In some embodiments, the baseline metrics include at least a time cost of a current training run per a number of cycles for the current training run. In some embodiments, the baseline metrics include a first training efficiency metric when using a first number of training resources.

At block 606, the method includes determining whether a current number of available training resources is an integer multiple of a minimum threshold of training resources.

At block 608, the method includes, responsive to the current number of available training resources being an integer multiple of the minimum threshold of training resources: initializing one or more try-runs to evaluate vertical scaling and initializing one or more try-runs to evaluate horizontal scaling.

At block 610, the method includes, responsive to the current number of available training resources not being an integer multiple of the minimum threshold of training resources, initializing one or more try-runs that only evaluate vertical scaling.

At block 612, the method includes identifying a try-run having a highest improvement metric.

At block 614, the method includes, responsive to the highest improvement metric being greater than a predetermined threshold, updating a training pattern for the parallelized training environment. In some embodiments, the updated training pattern includes one or both of a vertical scaling and a horizontal scaling of the set of training resources.

In some embodiments, the method includes determining a maximum threshold of training resources for training the large language model.

In some embodiments, the method includes determining a second training efficiency metric for at least one try-run. In some embodiments, the second training efficiency metric is defined as a ratio between a number of samples used during the respective try-run and a total time of the try-run when using a second number of training resources.

In some embodiments, the highest improvement metric is defined as a ratio of the second training efficiency metric to the first training efficiency metric divided by a ratio of the second number of training resources to the first number of training resources.

In some embodiments, the method includes saving a current training state of the parallelized training environment prior to initializing a try-run for evaluating training efficiency metrics. In this manner, the parallelized training environment can be rapidly returned to the original training state if no vertical or horizontal scaling is required (or the predetermined threshold increase in training efficiency is not reached, as previously discussed).

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising: training a large language model within a parallelized training environment comprising a set of training resources, the large language model split into a plurality of pieces, each training resource of the set of training resources training over one piece of the plurality of pieces; collecting baseline metrics for the parallelized training environment, the baseline metrics comprising at least a time cost of a current training run per a number of cycles for the current training run; determining whether a current number of available training resources is an integer multiple of a minimum threshold of training resources; responsive to the current number of available training resources being an integer multiple of the minimum threshold of training resources: initializing one or more try-runs to evaluate vertical scaling; and initializing one or more try-runs to evaluate horizontal scaling; responsive to the current number of available training resources not being an integer multiple of the minimum threshold of training resources, initializing one or more try-runs that only evaluate vertical scaling; identifying a try-run having a highest improvement metric; and responsive to the highest improvement metric being greater than a predetermined threshold, updating a training pattern for the parallelized training environment, wherein the updated training pattern comprises one or both of a vertical scaling and a horizontal scaling of the set of training resources; wherein the baseline metrics comprise a first training efficiency metric when using a first number of training resources; further comprising determining a second training efficiency metric for at least one try-run, wherein the second training efficiency metric is defined as a ratio between a number of samples used during the respective try-run and a total time of the try-run when using a second number of training resources; and wherein the highest improvement metric is defined as a ratio of the second training efficiency metric to the first training efficiency metric divided by a ratio of the second number of training resources to the first number of training resources.

2. The computer-implemented method of claim 1, wherein the training of the large language model initializes in response to the current number of training resources being at least equal to the minimum threshold of training resources.

3. The computer-implemented method of claim 1, further comprising determining a maximum threshold of training resources for training the large language model.

4. The computer-implemented method of claim 1, further comprising saving a current training state of the parallelized training environment prior to initializing a try-run for evaluating training efficiency metrics.

5. A system having a memory, computer readable instructions, and one or more processors for executing the computer readable instructions, the computer readable instructions controlling the one or more processors to perform operations comprising: training a large language model within a parallelized training environment comprising a set of training resources, the large language model split into a plurality of pieces, each training resource of the set of training resources training over one piece of the plurality of pieces; collecting baseline metrics for the parallelized training environment, the baseline metrics comprising at least a time cost of a current training run per a number of cycles for the current training run; determining whether a current number of available training resources is an integer multiple of a minimum threshold of training resources; responsive to the current number of available training resources being an integer multiple of the minimum threshold of training resources: initializing one or more try-runs to evaluate vertical scaling; and initializing one or more try-runs to evaluate horizontal scaling; responsive to the current number of available training resources not being an integer multiple of the minimum threshold of training resources, initializing one or more try-runs that only evaluate vertical scaling; identifying a try-run having a highest improvement metric; and responsive to the highest improvement metric being greater than a predetermined threshold, updating a training pattern for the parallelized training environment, wherein the updated training pattern comprises one or both of a vertical scaling and a horizontal scaling of the set of training resources; wherein the baseline metrics comprise a first training efficiency metric when using a first number of training resources; further comprising determining a second training efficiency metric for at least one try-run, wherein the second training efficiency metric is defined as a ratio between a number of samples used during the respective try-run and a total time of the try-run when using a second number of training resources; and wherein the highest improvement metric is defined as a ratio of the second training efficiency metric to the first training efficiency metric divided by a ratio of the second number of training resources to the first number of training resources.

6. The system of claim 5, wherein the training of the large language model initializes in response to the current number of training resources being at least equal to the minimum threshold of training resources.

7. The system of claim 5, the operations further comprising determining a maximum threshold of training resources for training the large language model.

8. The system of claim 5, the operations further comprising saving a current training state of the parallelized training environment prior to initializing a try-run for evaluating training efficiency metrics.

9. A computer program product comprising a computer readable storage medium having program instructions embodied therewith, the program instructions executable by one or more processors to cause the one or more processors to perform operations comprising: training a large language model within a parallelized training environment comprising a set of training resources, the large language model split into a plurality of pieces, each training resource of the set of training resources training over one piece of the plurality of pieces; collecting baseline metrics for the parallelized training environment, the baseline metrics comprising at least a time cost of a current training run per a number of cycles for the current training run; determining whether a current number of available training resources is an integer multiple of a minimum threshold of training resources; responsive to the current number of available training resources being an integer multiple of the minimum threshold of training resources: initializing one or more try-runs to evaluate vertical scaling; and initializing one or more try-runs to evaluate horizontal scaling; responsive to the current number of available training resources not being an integer multiple of the minimum threshold of training resources, initializing one or more try-runs that only evaluate vertical scaling; identifying a try-run having a highest improvement metric; and responsive to the highest improvement metric being greater than a predetermined threshold, updating a training pattern for the parallelized training environment, wherein the updated training pattern comprises one or both of a vertical scaling and a horizontal scaling of the set of training resources; wherein the baseline metrics comprise a first training efficiency metric when using a first number of training resource; further comprising determining a second training efficiency metric for at least one try-run, wherein the second training efficiency metric is defined as a ratio between a number of samples used during the respective try-run and a total time of the try-run when using a second number of training resources; and wherein the highest improvement metric is defined as a ratio of the second training efficiency metric to the first training efficiency metric divided by a ratio of the second number of training resources to the first number of training resources.

10. The computer program product of claim 9, wherein the training of the large language model initializes in response to the current number of training resources being at least equal to the minimum threshold of training resources.

11. The computer program product of claim 9, the operations further comprising determining a maximum threshold of training resources for training the large language model.

* * * * *